(12) United States Patent
Nakamura

(10) Patent No.: US 6,963,376 B2
(45) Date of Patent: Nov. 8, 2005

(54) DISTANCE MEASURING DEVICE AND A CAMERA PROVIDED WITH THE DISTANCE MEASURING DEVICE

(75) Inventor: Kenji Nakamura, Sakai (JP)

(73) Assignee: Minolta Co., Ltd., Osaka (JP)

( * ) Notice: Subject to any disclaimer, the term of this patent is extended or adjusted under 35 U.S.C. 154(b) by 596 days.

(21) Appl. No.: 09/753,002

(22) Filed: Jan. 2, 2001

(65) Prior Publication Data

US 2001/0008423 A1 Jul. 19, 2001

(30) Foreign Application Priority Data

Jan. 14, 2000 (JP) .................................. 2000-006528

(51) Int. Cl.⁷ ............................................. H04N 5/232
(52) U.S. Cl. ...................... 348/345; 348/135; 356/3; 382/106; 396/121
(58) Field of Search ............................. 348/345, 348, 348/396, 229, 135, 137, 140, 116, 169, 25, 136, 221.9, 347, 139, 142; 396/120, 121, 124; 382/106; 356/3, 21, 614, 624–25; 701/225; 359/436

(56) References Cited

U.S. PATENT DOCUMENTS

| | | | |
|---|---|---|---|
| 5,051,767 A | * 9/1991 | Honma et al. ................. 396/80 |
| 5,068,737 A | 11/1991 | Taniguchi et al. ........... 358/227 |
| 5,305,046 A | * 4/1994 | Sato ............................. 396/123 |
| 5,563,677 A | * 10/1996 | Muramatsu et al. ......... 396/121 |
| 5,929,980 A | * 7/1999 | Yamaguchi et al. ........ 356/4.03 |
| 5,960,219 A | * 9/1999 | Kageyama et al. .......... 396/104 |
| 6,038,405 A | * 3/2000 | Kageyama .................... 396/92 |
| 6,154,253 A | * 11/2000 | Kiri et al. .................... 348/345 |
| 6,242,727 B1 | * 6/2001 | Nakamura ................. 250/201.2 |
| 6,330,055 B1 | * 12/2001 | Higashino ................... 356/3.06 |
| 6,433,824 B1 | * 8/2002 | Tanaka et al. .............. 348/345 |

FOREIGN PATENT DOCUMENTS

JP        11-119088 A     4/1999

* cited by examiner

*Primary Examiner*—Tuan Ho
*Assistant Examiner*—Gevell Selby
(74) *Attorney, Agent, or Firm*—Sidley Austin Brown & Wood LLP

(57) ABSTRACT

In the distance measuring device, even if there are unmeasurable distance measuring regions, suitable estimate is set as the distance data of the unmeasurable region in accordance with distance data of the measurable distance measuring regions and the space on the object of the unmeasurable distance measuring region. In this way accurate recognition is possible, for example, when an object is divided by an unmeasurable region, or objects are continuous.

10 Claims, 10 Drawing Sheets

# DISTANCE MEASURING DEVICE AND A CAMERA PROVIDED WITH THE DISTANCE MEASURING DEVICE

This application is based on Patent Application No. 2000-6528 filed in Japan, the content of which is hereby incorporated by reference.

BACKGROUND OF THE INVENTION

1. Field of the Invention

The present invention relates to a distance measuring device and a camera provided with this distance measuring device, and further relates, for example, to a distance measuring device such as a still camera, video camera and the like, and an input device such as an image recognition device and the like.

2. Description of the Related Art

Various conventional cameras have been proposed which recognize a main object as a main object for photography, and automatically set the focus and exposure of the object.

In this case, although the distance to the main object to be focused is determined from measurement information, the measurement data are not necessarily measurement data having high reliability. For example, U.S. Pat. No. 5,068,737 discloses art which accomplishes focus adjustment using data having high reliability as a method of focus adjustment in these cases. In addition, Japanese Laid-Open Patent Application No. 11-119088 discloses a focus adjustment method for focusing when data reliability is low.

When recognizing a main object as a basis of distance information regarding the object, consider a plurality of measurement areas are arranged, and the field of the main object is recognized as a basis of distance data of each measurement area, and recognizing the main object from the field information.

In the case of passive type distance measuring systems, however, accurate distance measurement data cannot be obtained with regard to, for example, parts of the object having low contrast, parts of the object which are dark, parts of the object having different distances but included in the same distance measuring area, and parts of the object which are too bright.

In the case of active type distance measuring systems, accurate distance measurement data cannot be obtained with regard to, for example, parts of the object having low reflectivity, parts of the object having direct reflection, parts wherein reflectivity varies within the illumination range of the distance measuring beam and the like.

When accurate distance measurement data cannot be obtained due to such theoretical problems, for example, the distance to part of the object cannot be measured. For this reason main object recognition may be impossible or erroneous recognition may occur because separate divisions of the object may be recognized despite the fact it is a single object.

Accordingly, the problems of the art solved by the present invention are overcome by providing a distance measuring device capable of accurately recognizing an object even when a part of the object cannot be accurately measured.

SUMMARY OF THE INVENTION

The aforesaid problems are eliminated by a distance measuring device comprising: a distance measuring sensor for measuring a plurality of regions of an object region and outputting measurement data; a detector for detecting an unmeasurable region within the plurality of measurement regions based on measurement data output from said distance measuring sensor; a calculator for calculating a spacing on the object corresponding to the unmeasurable region detected by said detector; and a creator for creating distance data of the unmeasurable region based on the distance data of the measurable region among the plurality of distance measuring regions and the spacing calculated by said calculator.

The aforesaid problems are eliminated by a camera provided with a distance measuring device comprising: a distance measuring sensor for measuring a plurality of regions of an object region and outputting measurement data; a detector for detecting an unmeasurable region within the plurality of measurement regions based on the measurement data output from said distance measuring sensor; a calculator for calculating a spacing on the object corresponding to the unmeasurable region detected by said detector; a creator for creating distance data of the unmeasurable region based on the distance data of the measurable region among the plurality of distance measuring regions and the spacing calculated by said calculator; a finder for viewing the object region; a display for displaying a range corresponding to each distance measuring region within the view of the finder; and a controller for recognizing a photographic object corresponding to the distance data of the measurable region and the created distance data of the unmeasurable region and for controlling display on said display in accordance with the recognition result.

The aforesaid problems are eliminated by a another camera provided with a distance measuring device comprising: a distance measuring sensor for measuring a plurality of regions of an object region and outputting measurement data; a detector for detecting an unmeasurable region within the plurality of measurement regions based on the measurement data output from said distance measuring sensor; a calculator for calculating a spacing on the object corresponding to the unmeasurable region detected by said detector; a creator for creating distance data of the unmeasurable region based on the distance data of the measurable region among the plurality of distance measuring regions and the spacing calculated by said calculator; a focus adjuster for adjusting the focus of the photographic lens; and a controller for recognizing a photographic object corresponding to the distance data of the measurable region and the created distance data of the unmeasurable region and for controlling said focus adjuster in accordance with the recognition result.

BRIEF DESCRIPTION OF THE DRAWINGS

In the following description, like parts are designated by like reference numbers throughout the several drawings.

DETAILED DESCRIPTION OF THE PREFERRED EMBODIMENTS

The embodiments of the distance measuring device of the present invention used in an autofocus (AF) camera are described hereinafter with reference to the accompanying drawings.

Figure 1:
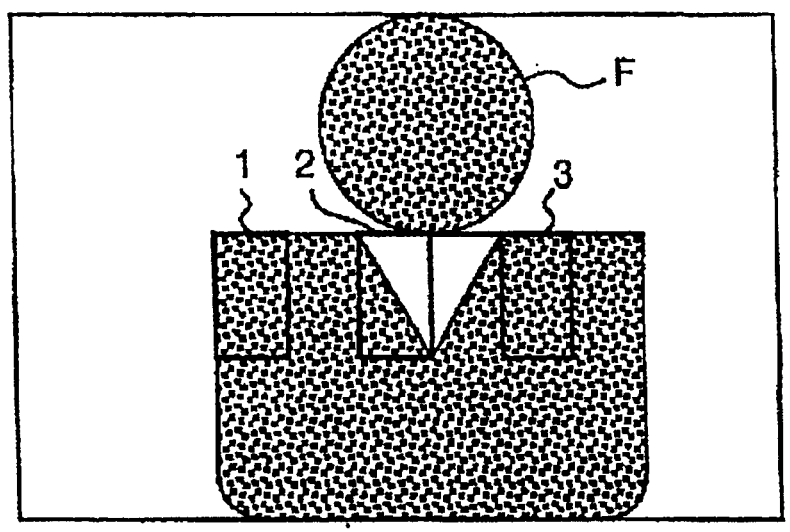
FIG. 1 shows an active type AF.
Figure 2A:
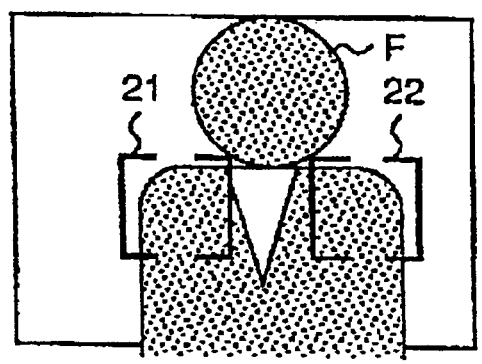
FIGS. 2(a) and 2(b) show the display in the finder of an active type AF.
Figure 2B:
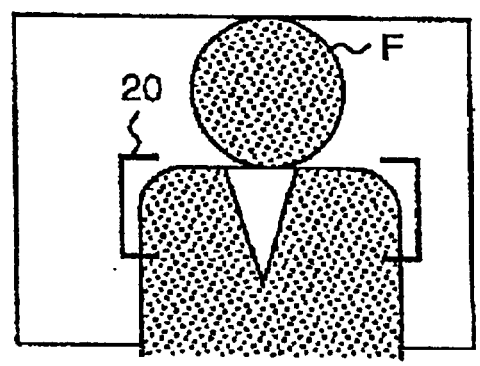

FIGS. 1, 2(a), and 2(b) show examples of an active AF.

As shown in FIG. 1, three distance measuring areas 1, 2, and 3 are set relative to an object region, i.e., the photographic region, and the distance is measured by an active method. At this time distance measuring area 2 is determined to be unmeasurable due to the different reflectivities of the black clothing and white collar of the object F.

In this case, in a conventional camera, either both or one or another of two focus frames 21 and 22 corresponding to distance measuring areas 1 and 3 are displayed, and induce a feeling of unease in the photographer.

In contrast, in the present invention, the measurement data of the distance measurement areas 1 and 3 are within a specific distance difference, such that when the space between the distance measurement areas 1 and 3 is relatively close at approximately 30 cm, the object is determined to be the same from the distance measurement area 1 to the distance measurement area 3. Then, the distance measurement data of one or another of the distance measurement area 1 and 3, or the average value of both distance data of areas 1 and 3, are used as the distance data of the distance measurement area 2. The space of the distance measuring area 1 and distance measuring area 3 is space in the actual object F, and is calculated based on the distance data of the distance measuring area 1 and distance measuring area 3 and the illumination angle of the distance measuring beam. Below, the space of the distance measuring area represents the actual space on the object F. As shown in FIG. 2(b), one focus frame 20 corresponding to the entirety of the distance measuring areas 1~3 is displayed in the finder. This focus frame 20 is natural to the photographer and does not induce unease in the photographer.

Figure 3:
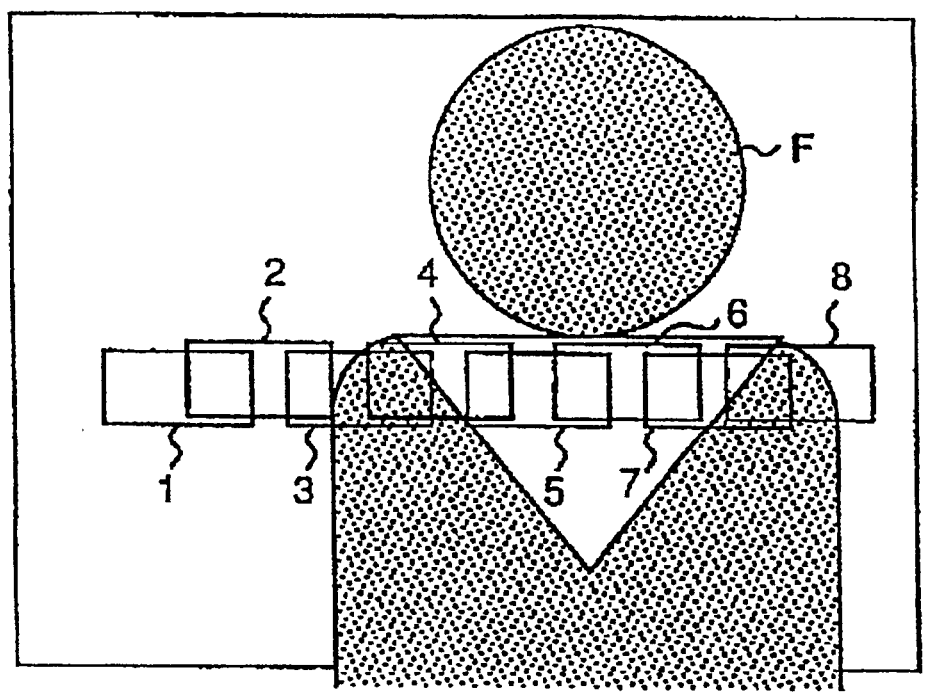
FIG. 3 shows a passive type AF.
Figure 4A:
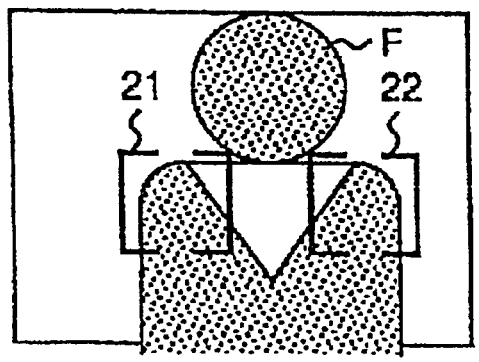
FIGS. 4(a) and 4(b) show the display in the finder of a passive type AF.
Figure 4B:
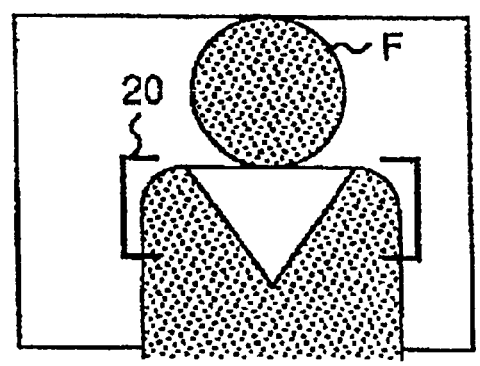

FIGS. 3, 4(a), and 4(b) are examples of passive AF.

As shown in FIG. 3, eight distance measuring areas 1~8 are set, and distance is measured by the passive method. At this time, the distance measuring areas 5 and 6 are within the collar area of the object F, contrast is low, and the distance is unmeasurable.

In this case, in a conventional camera, either both or one or another of two focus frames 21 and 22 corresponding to distance measuring areas 3, 4, and 7, 8 are displayed in the finder as shown in FIG. 4(a), and induce a feeling of unease in the photographer.

In contrast, in the present invention, the measurement data of the distance measurement areas 4 and 7 are within a specific distance difference, and when the spacing of distance measuring areas 4 and 7 is relatively close to approximately 30 cm, the distance data (or the average value) of the distance measuring areas 5 and 6 are set as the distance data of the distance measuring area 4 or 7. Then, one focus frame 20 corresponding to the entirety of the distance measuring areas 3~8 is displayed in the finder, as shown in FIG. 4(b). This focus frame 20 is natural to the photographer and does not induce unease in the photographer.

Figure 5:
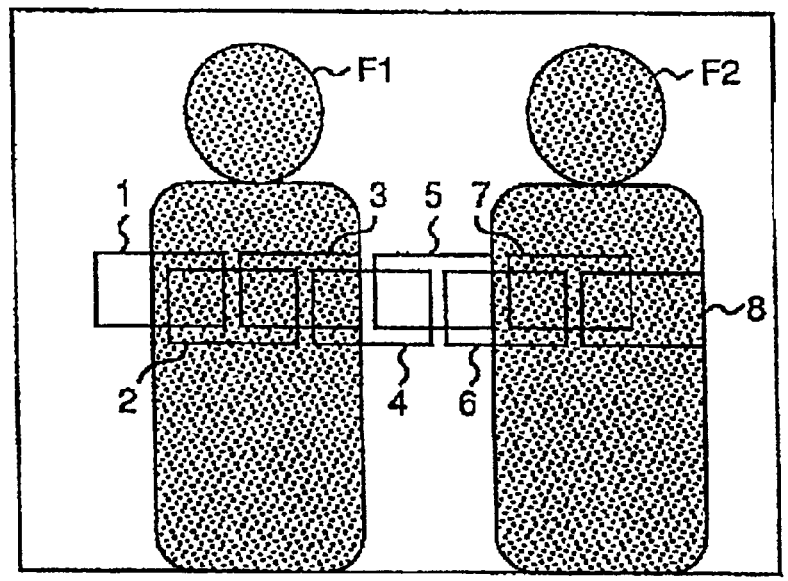
FIG. 5 illustrates an unmeasurable distance measuring region.

FIG. 5 shows the case wherein the distance measuring area 5 between two objects F1 and F2 is unmeasurable due to low contrast. In this instance the other distance measuring areas 1~4, and 6~8 are measurable. When the difference in luminance of the distance measuring areas 1~4 and areas 6~8 adjacent to the distance measuring area 5 and the luminance of the distance measuring area 5 exceeds a predetermined value, the distance data of the distance measuring area 5 is deemed indefinite (i.e., unmeasurable). In this way the separation between the two objects F1 and F2 can be recognized.

Figure 6:
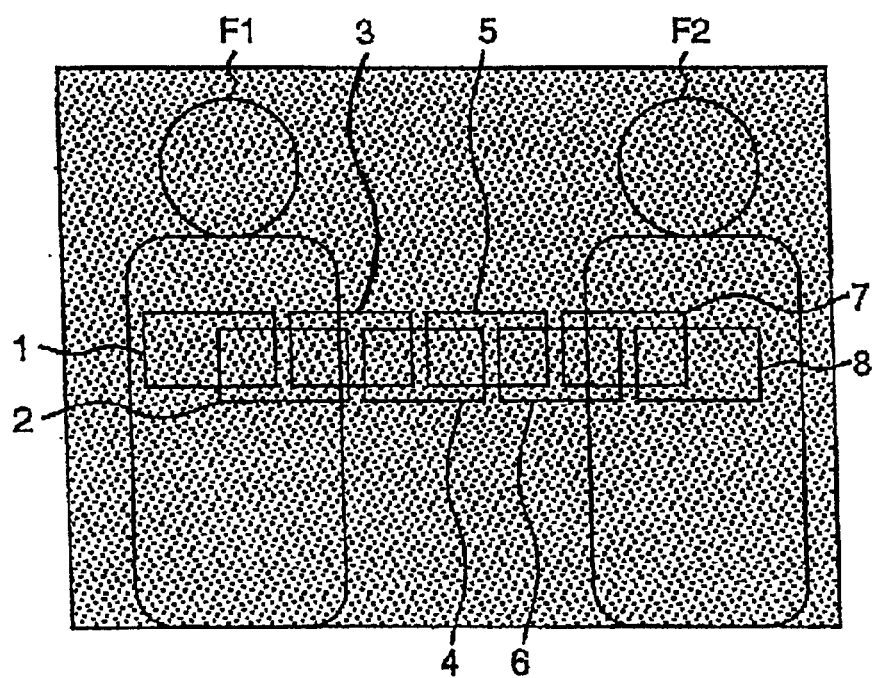
FIG. 6 illustrates an unmeasurable distance measuring region.

FIG. 6 shows the case wherein distance measuring areas 4 and 5 are unmeasurable due to low contrast, but other distance measuring areas 1~3 and areas 6~8 are measurable. In this instance if the space on the object corresponding to the distance measuring areas 3 and 6 adjacent to the distance measuring area 5 is greater than a predetermined value, the distance data of the distance measuring areas 4 and 5 are deemed indefinite (i.e., unmeasurable). In this way the separation of the two objects F1 and F2 can be recognized. Furthermore, FIG. 6 shows the case wherein there is slight luminance difference between the two objects F1 and F2 and other regions (background regions).

Figure 7:
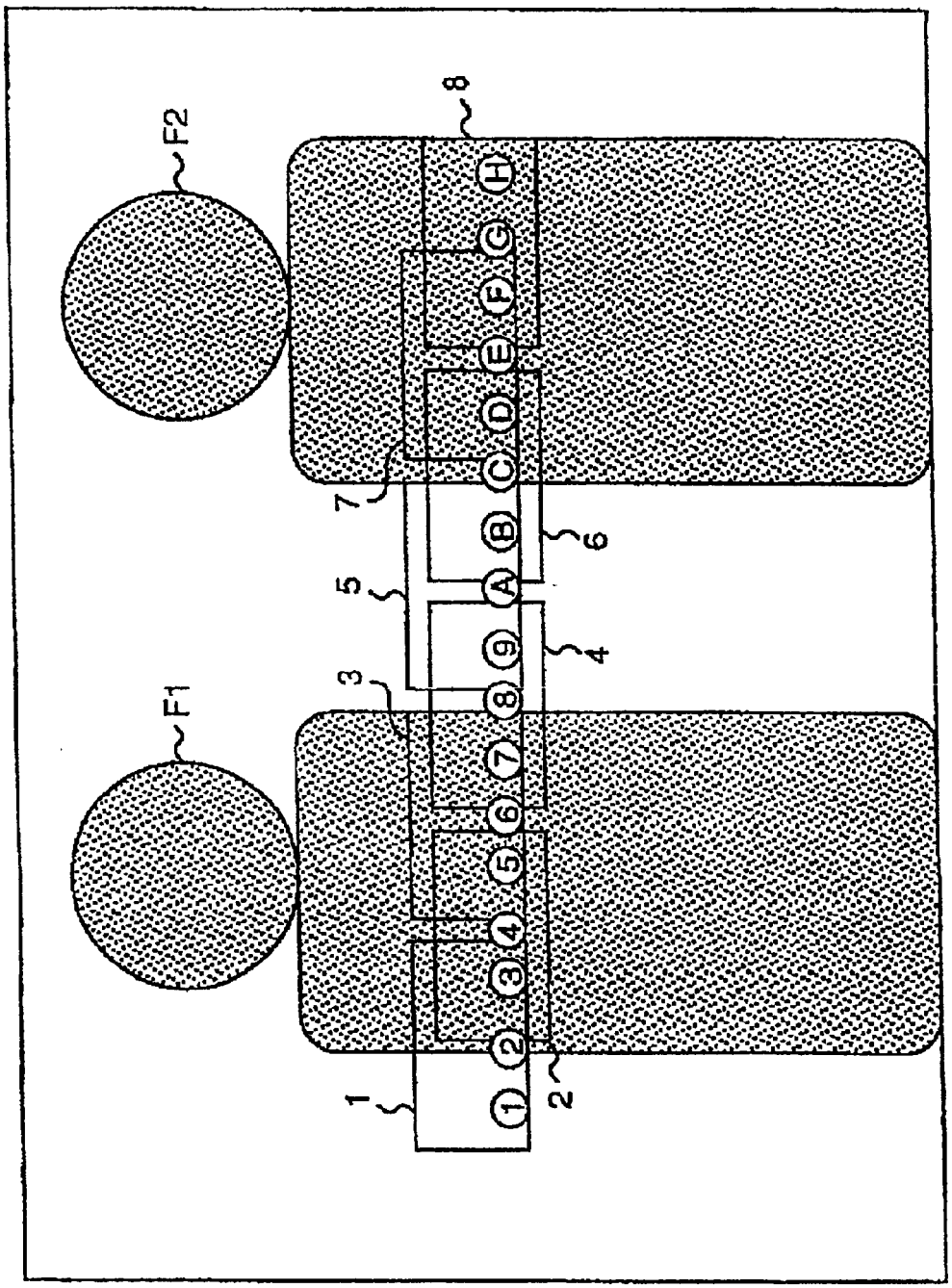
FIG. 7 illustrates an unmeasurable distance measuring region.

FIG. 7 shows three distance measuring points (1)~(H) marked by circles corresponding to each distance measuring area 1~8, and analogous adjacent distance measuring areas overlap at one distance measuring point. FIG. 7 shows the case wherein distance measuring area 5 includes distance measuring points (9), (A), and (B) of the distance measuring area between the objects F1 and F2, and the distance measuring area 5 is unmeasurable due to low contrast.

In this instance, point 1: when the distance between distance measuring point (8) and (C) is approximately equal; point 2: when the luminance variance of specific distance measuring areas 4, 5, 6 including the distance measuring points (9)~(B) and distance measuring points (8) and (C) are within a predetermined value; and point 3: when the spacing of distance measuring points (8) and (C) are within a predetermined value, the distance data of the distance measuring points (9)~(B) are set based on the distance measuring data of the distance measuring points circumscribing and including the distance measuring points (8) and (C). For example, the average value, closest value, value of distance measuring points (8) or (c) are set.

However, the distance values of the measuring points (9)~(B) cannot be set when the difference in luminance of the object F1 and object F2 and distance measuring area 5 is too large.

Figure 8:
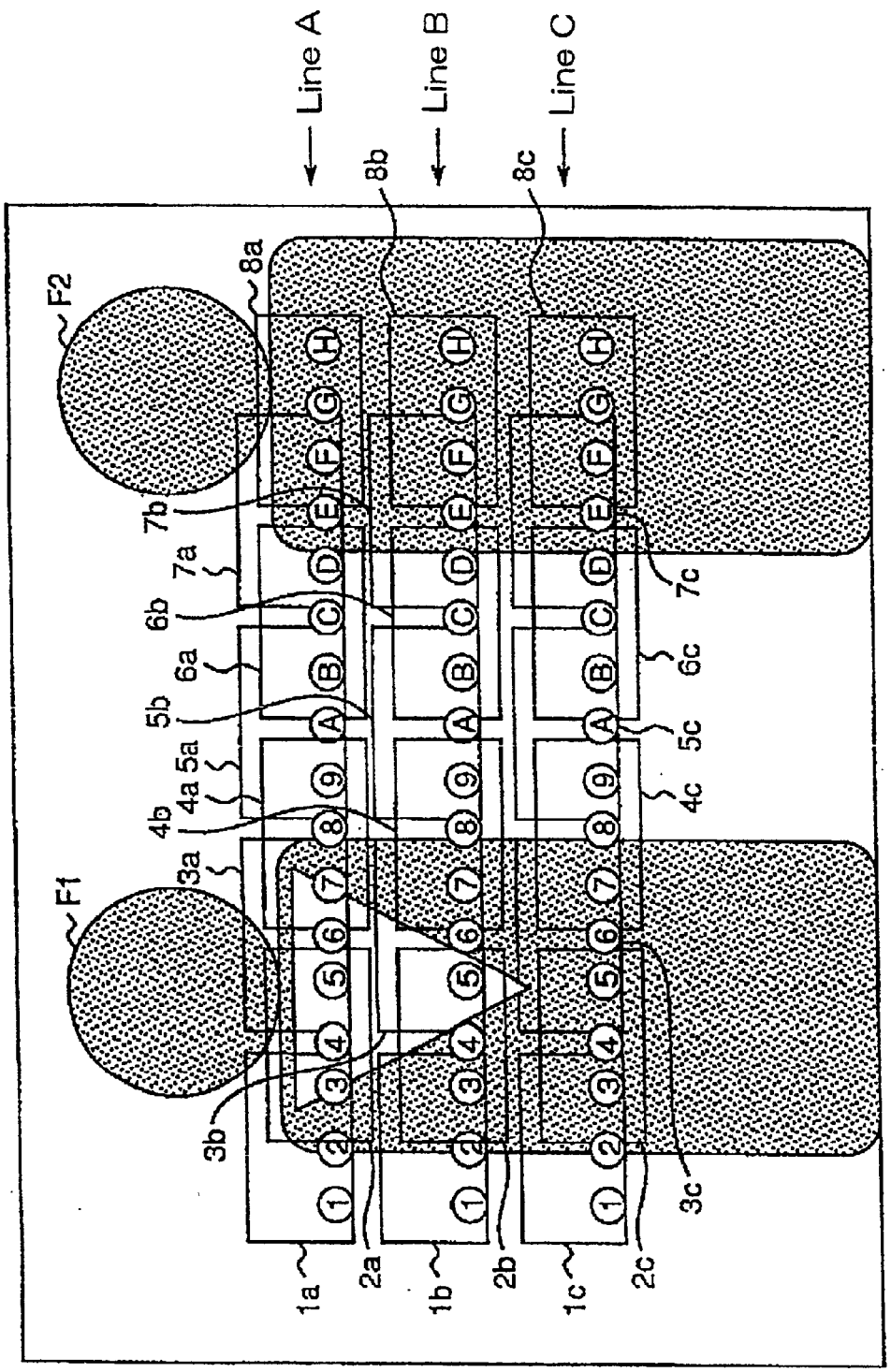
FIG. 8 illustrates an unmeasurable distance measuring region.

FIG. 8 shows an example of distance measuring sensors arrayed in plurality. In the drawing, the unmeasurable distance measuring points are (4)~(6) and (9)~(C) in row A, and (5) and (9)~(C) in row B, and (9)~(C) in row C.

In this example, the unmeasurable measuring points can be determined if the measuring point is low contrast even when the measuring point is related to a measurable distance measuring area.

Each measuring point (4)~(6) of row A and (5) of row B are set based on the distance data of distance measuring points including measurable measuring points (at least any among (3), (7) of row A, (4), (6) of row B, (5) of row C).

In the distance data of measuring points (9)~(C) of rows A~C, the difference in luminance of measuring points (9)~(C) and the luminance of peripheral measuring points including at least one peripheral measuring point (8) and (D) exceeds a predetermined value, such that the distance data are not set because the spacing of measuring points (8) and (D) (i.e., the measuring point adjacent to the respective measuring points (9) and (C)) exceeds a predetermined value.

Figure 9:
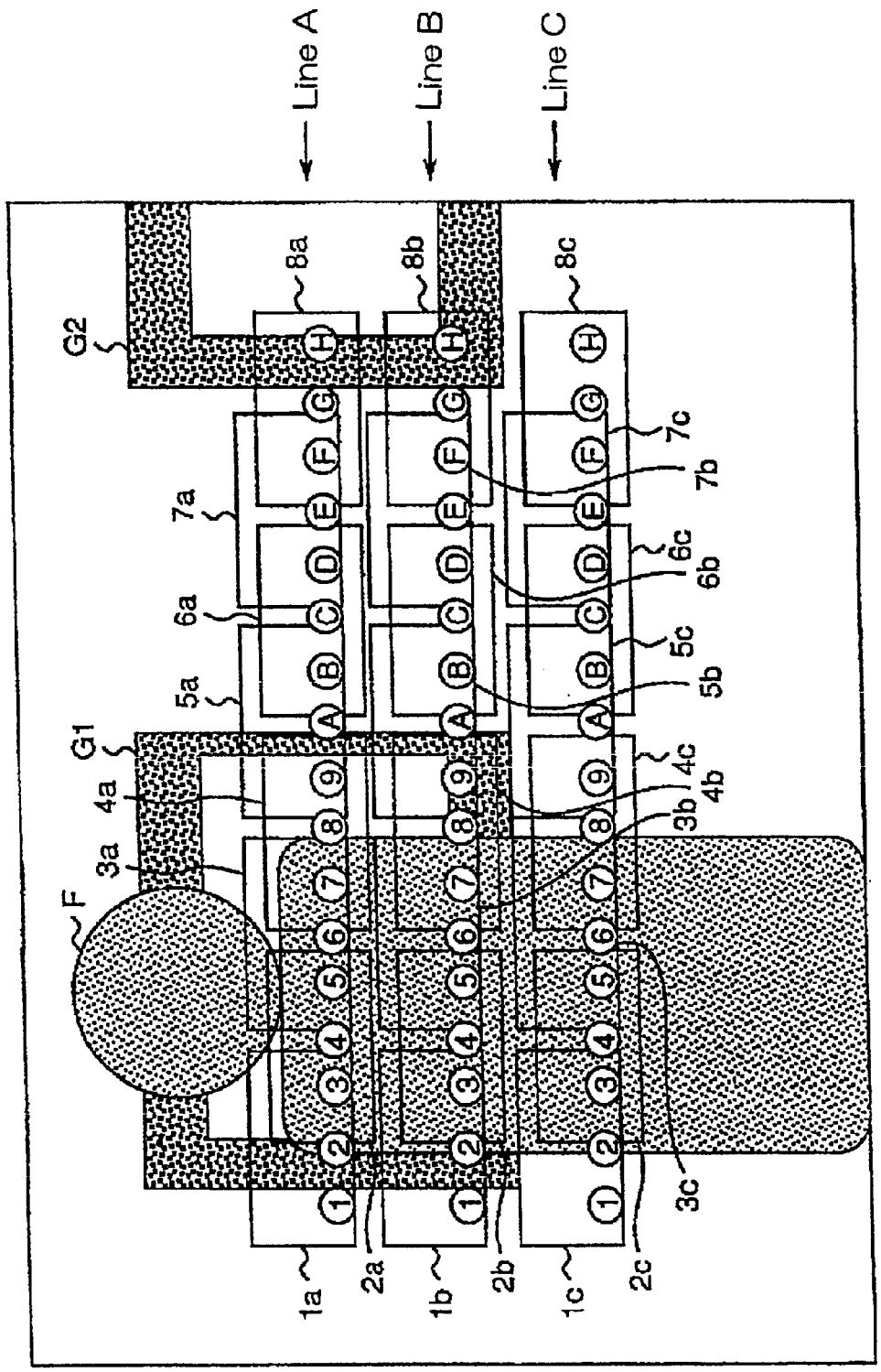
FIG. 9 illustrates an unmeasurable distance measuring region.

FIG. 9 shows an example of a person F standing in front of pictures G1 and G2 on a wall. In the drawing, the unmeasurable measuring points are (B)~(G) in row A, (B)~(G) in row B, and (8)~(H) in row C.

In this example, because the spacing of the measuring points (B) and (G) is sufficiently large, the distance data of measuring points (B)~(G) are set based on distance data including at least any of the measurable measuring points (A) and (H) have contrast.

For example, for the distance data of the measuring points (B)~(G), the same value as the distance data of either measuring point (A) or (H) is set, or the average value of distance data of measuring points (A) and (H) is set, or linearly interpolated data of the distance data of measuring points (A) and (H) is set.

Figure 10:
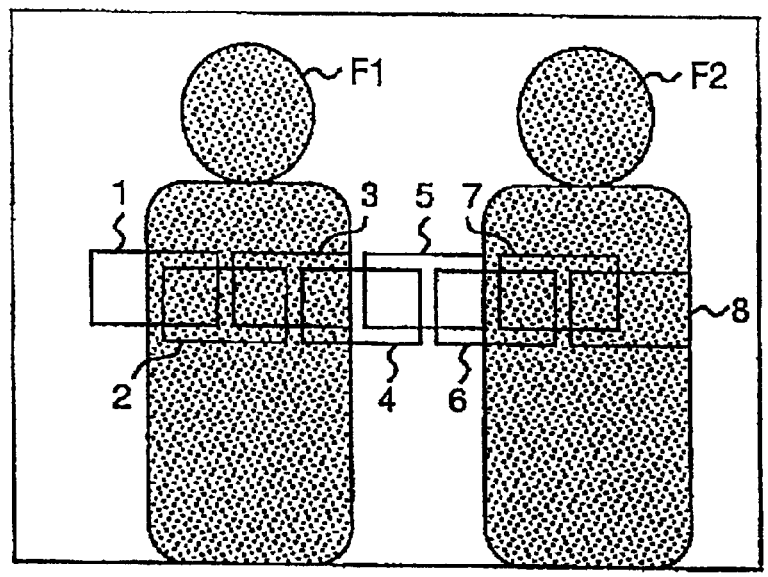
FIG. 10 illustrates an unmeasurable distance measuring region.

FIG. 10 shows a case wherein there are two people and the background is bright. The distance measuring area 5 has low contrast and is therefore unmeasurable, but the other areas are measurable. In this instance if the difference in luminance of the areas 1~4 and 6~8 adjacent to the area 5 and the luminance of area 5 exceeds a predetermined value, area 5 is determined to appear different from either of the two left and right objects F1 and F2, and the distance data of this area 5 is indefinite (unmeasurable).

Figure 11:
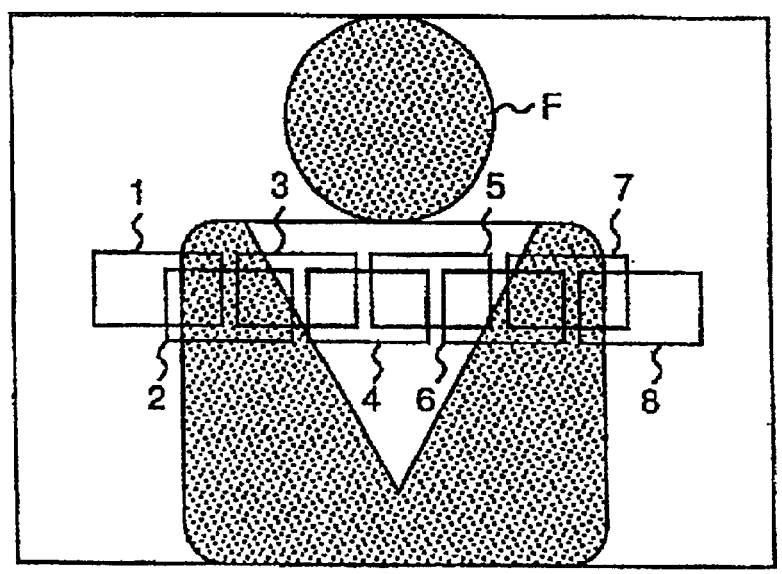
FIG. 11 illustrates an unmeasurable distance measuring region.

FIG. 11 shows a case wherein a single person is shown and the base of the collar is unmeasurable. Areas 4 and 5 are unmeasurable due to low contrast, but other areas are measurable. In this instance if the spacing of areas 3 and 6 is within a predetermined value and the luminance difference of areas 2 and 7 is within a predetermined value, areas 4 and 5 are determined as being the same object as the peripheral areas 3 and 6, and the distance data calculated from areas 3 and 6 is set.

Figure 12:
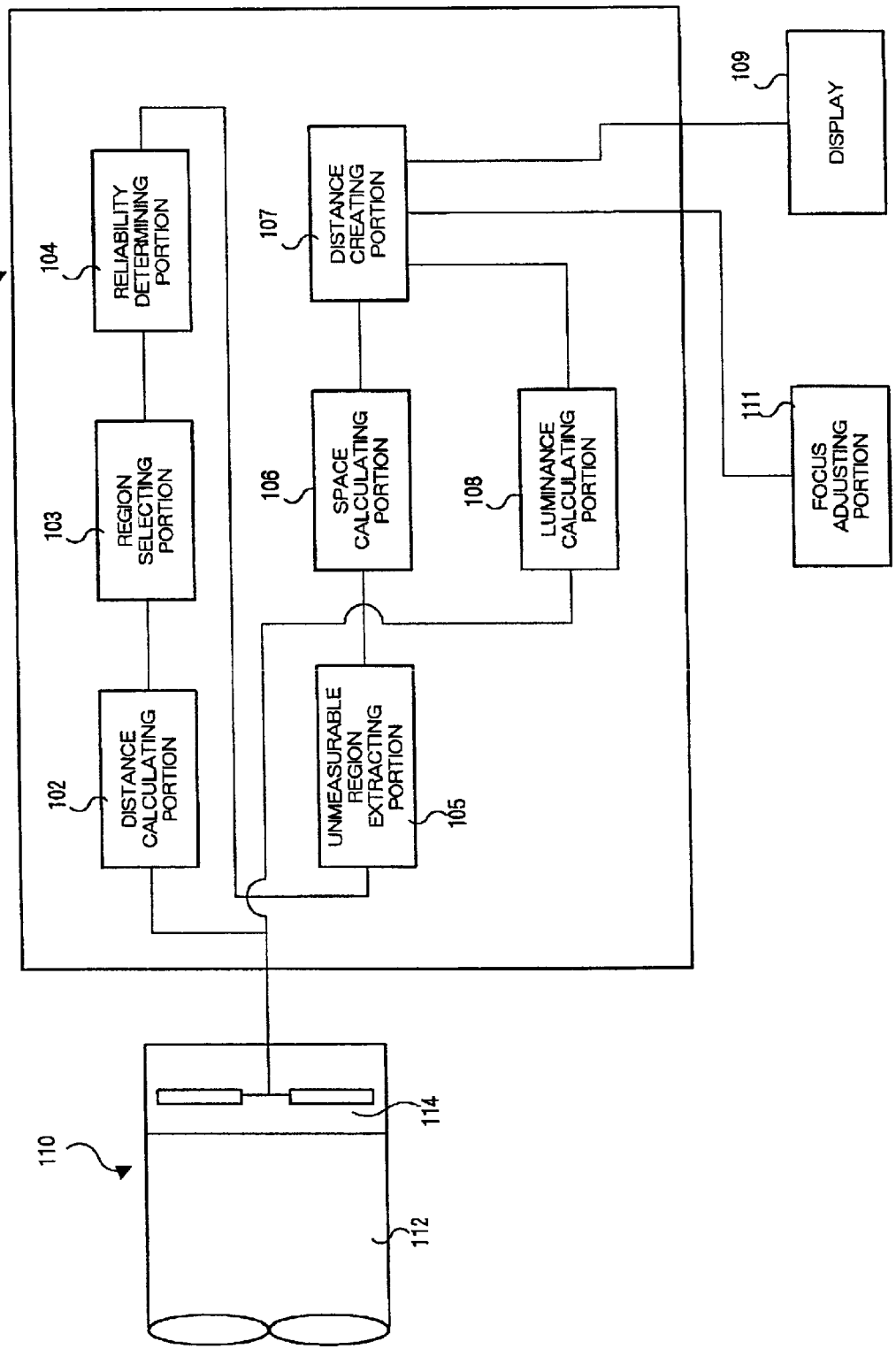
FIG. 12 is a block diagram of the distance measuring device of the present invention.

FIG. 12 is a block diagram showing the structure of a camera provided with the distance measuring device.

The distance measuring device shown in FIG. 12 is provided with a distance measuring module 110 and a data processing circuit 100.

The distance measuring module 110 includes two lenses 112 and a sensor 114. The sensor 114 may be either an area sensor, or a line sensor. The lens 112 forms an object image on the sensor 114. The output of the sensor 114 is not only used for distance measuring, but also for luminance detection.

The data processing circuit 100 processes the data output from the sensor 114. The data processing circuit 100 is provided with a distance calculating portion 102, region selecting portion 103, reliability determining portion 104, unmeasurable region extracting portion 105, space calculating portion 106, distance creating portion 107, and luminance calculating portion 108.

The distance calculating portion 102 compares the two sets of data from the sensor 114, and determines the distance data for each measuring point. The region selecting portion 103 sets the distance measuring area in accordance with the focal length of the taking lens, and the photographic mode and the like, and extracts the distance data corresponding to the measuring points within a set distance measuring area from the distance data determined by the distance calculating portion. The reliability determining portion 104 determines the reliability of the distance data of the measuring points within the distance measuring area extracted by the region selecting portion 103. The unmeasurable region extracting portion 105 extracts unmeasurable regions based on the reliability result of the reliability determining portion 104. The space calculating portion 106 calculates the space of the unmeasurable region on the object based on the unmeasurable region extraction result by the unmeasurable region extracting portion 105. The luminance calculating portion 108 calculates the luminance corresponding to each measuring point based on the output of the sensor 114. The distance creating portion 107 suitably creates the distance data for each measuring point of the unmeasurable region based on the space of the unmeasurable region determined by the space calculating portion 106 and the difference in luminance of the measurable regions and the unmeasurable regions determined by the luminance calculating portion 108.

A display 109 displays a focus frame in the finder shown in FIG. 4(b) based on the output of the distance creating portion 107. A focus adjusting portion 111 drives the taking lens to a focus position based on the distance data of the unmeasurable region and the distance data of the measurable regions output from the distance creating portion 107.

Figure 13:
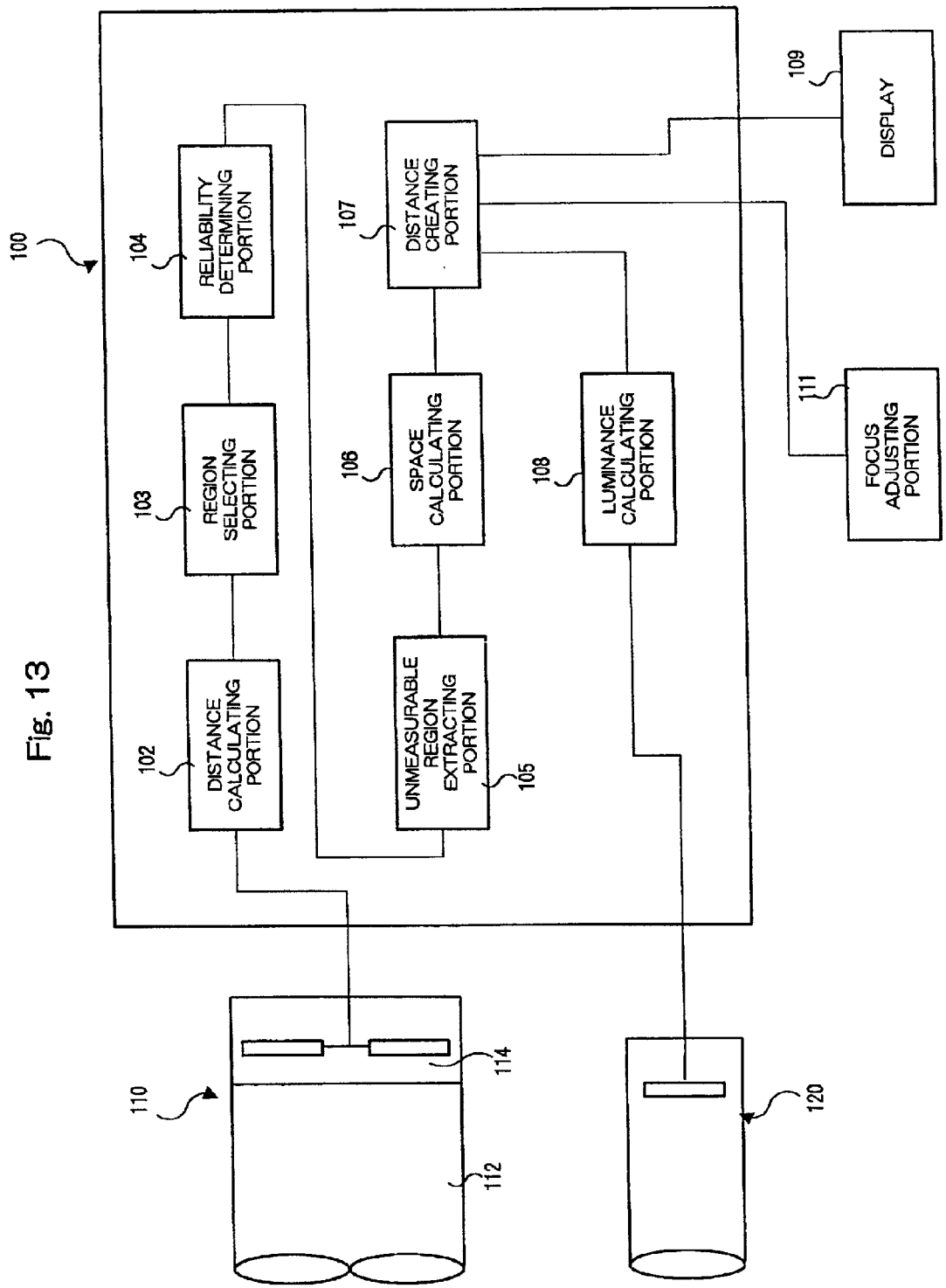
FIG. 13 is a block diagram of another distance measuring device of the present invention.

FIG. 13 is a block diagram of a distance measuring device when a photometry module 120 is provided separately from the distance measuring module 110. In this instance the sensor of the photometry module 120 is divided into a plurality of areas, and the luminance calculating portion 108 can detect a luminance corresponding to each measuring point based on the output of the photometry module 120.

Figure 14:
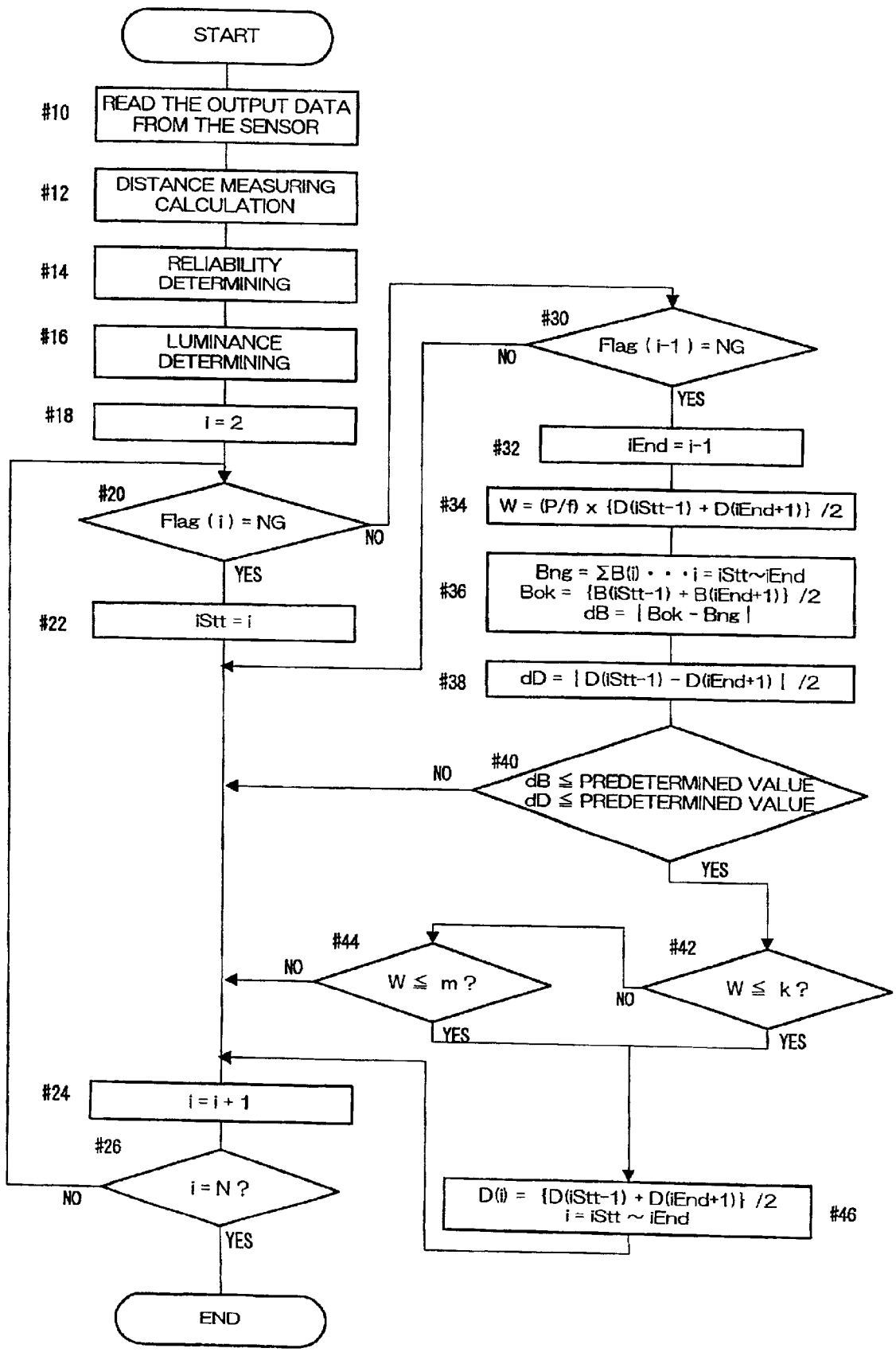
FIG. 14 is a flow chart of the operation of the distance measuring device of the present invention.

FIG. 14 is a flow chart regarding the calculation for setting the space data W on the object between the separated measurable regions (i.e., unmeasurable region), luminance difference dB between the unmeasurable region and the measurable region adjacent thereto, distance difference dD of the measurable region, and the distance of the unmeasurable region.

First, the data processing circuit 100 reads the output data of the sensor 114 from the distance measuring module 110 (#10), and executes the distance measuring calculation for a specific number N of measuring points (#12). Then, the distance data D(i) is calculated for the no. i i=2~N) measuring point. Then, the reliability of the distance data D(i) is determined for a specific number N of measuring points (#14), and OK (reliable) or NG (unreliable) is set for the reliability flag (i) of the distance data corresponding to the no. i measuring point. The luminance near each measuring point is detected (#16), and the luminance data B(i) is determined for the no. i measuring point.

Then, [2] is set as the initial value of i (#18), and the following routine is repeated only for the number of measuring points (#24, #26).

That is, the reliability of the no. i measuring point is determined by the reliability flag (#20). If the data are unreliable (#20: YES) the unmeasurable region starting point parameter iStt is set to i (#22), incrementation is executed (#24), and the routine returns to #20 until i=N is attained (#26). After the starting point parameter iStt is set to i, #22 is skipped.

If the data of the no. i measuring point are reliable (#20: NO), the reliability of the no. i-1 measuring point is determined (#30). If the data are reliable (#30: NO), the routine advances to the previously described #24. If the data are unreliable (#30: YES), the unmeasurable region end point parameter iEnd is set to (#32), and the calculation below is executed.

First, the space data W of the unmeasurable region on the object is calculated by the equation below (#34).

$$W=(P/f)\times\{D(iStt-1)+D(iEnd+1)\}/2$$

Where the space between the iStt no. measuring point and the iEnd no. measuring point is the unmeasurable region. P represents the space on the sensor 114 from the iStt no. measuring point to the iEnd no. measuring point, f represents the focal length of the lens 112 of the distance measuring module 110, D(iStt−1) represents the distance data of the iStt−1 no. measuring point, and D(iEnd+1) represents the distance data of the iEnd+1 no measuring point.

Then, the luminance difference dB of the luminance Bng of the unmeasurable region and the average luminance Bok of the adjacent measurable regions is calculated (#36).

The luminance Bng of the unmeasurable region is the "average" luminance of the unmeasurable region. The sum of the luminance data B(i) corresponding to each measuring point i=iStt, iStt+1, . . . iEnd of the unmeasurable region is divided by (iEnd−iStt+1) to obtain the average.

The average luminance Bok of the measurable regions adjacent to the unmeasurable region is the average value of luminance B(i) corresponding to the measuring points i=iStt−1, iEnd+1 adjacent to the unmeasurable region.

The luminance difference dB is the absolute value of the difference between the luminance Bng of the unmeasurable region and the average luminance Bok of the adjacent measurable regions.

Then, the distance difference dD of the measuring points adjacent to both sides of the unmeasurable region is calculated (#38). The distance difference dD is one half of the absolute value of the difference of the distance data D(i) of measuring points iStt−1 and iEnd+1 adjacent to the unmeasurable region.

Next, a determination is made as to whether or not the luminance difference dB between the unmeasurable region and the measurable region is less than a predetermined value (e.g., 0.5 level), and a determination is made as to whether or not the distance difference dD of the measuring points on either side of the unmeasurable region is less than a predetermined value (e.g., 50 cm) (#40). If this condition is not satisfied (#40: NO), the routine advances to #24. If this condition is satisfied (#40: YES), a determination is made as to whether or not the space data W of the unmeasurable region on the object is less than a specific value [k] (e.g., 30 cm) (#42). If the space data W is less than a specific value [k] (#42: YES), the average value of the distance data D(iStt−1) and D(iEnd+1) is set as the distance data D(i) (where i=iStt, iStt+1, . . . iEnd) of the unmeasurable region (#46), and the routine advances to #24.

If the space data W is not less than [k] (#42: NO), a determination is made as to whether or not the space data w is greater than a predetermined value [m] (e.g., 2 m) (#44). If the space data W is greater than [m] (#44: YES), the routine advances to #46. If the space data W is not greater than [m] (#44: NO), the routine advances to the previously mentioned #24. When [k<W<m] per #42 and #44, the distance data D(i), where i=iStt, iStt+1, . . . iEnd, of the unmeasurable region is deemed indefinite.

In the case of a distance measuring area for which measurement data (i.e., distance data) cannot be obtained due to problems relating to the principles of active type AF and passive type AF, conventionally the position and shape of an object cannot be recognized because the distance of continuous objects are unobtainable.

However, according to the method of the present invention, the position and shape of an object can be recognized because it is possible to set the distance of unmeasurable regions.

If the distance measuring areas arranged on the periphery of an unmeasurable distance measuring area are measurable, the distance of the object corresponding to the unmeasurable area can be determined in accordance with this condition (distance data and luminance, space of the unmeasurable region).

In recognizing the object, a range image of the object is constructed from the distance data of the measurable distance measuring areas. In this case also, a range image is constructed from the peripheral range images in a region for which a range image cannot be constructed due to an unmeasurable distance measuring area.

According to the present invention, even in an unmeasurable distance measuring region suitable estimate data may be set as the distance data of the unmeasurable region in accordance with distance data of the measurable distance measuring regions and the space on the object of the unmeasurable distance measuring region.

Accordingly, even when part cannot be measured, suitable data may be set as the data of that part, such that the object can be accurately recognized. In this way accurate recognition is possible, for example, when an object is divided by an unmeasurable region, or objects are continuous.

The functions offered below, for example, may also be used to obtain the distance data of an unmeasurable region.

First, in the recognition of an object, the recognition of an object is improved by eliminating the erroneous recognition of an object as two objects when distance information is missing.

Second, the size of an object can be accurately handled. For this reason, when an in-focus position is overlaid in the display of a viewfinder in a camera or the like, there are not two or more displays of a single object, and one or another of the displays is not shown, thus eliminating anxiety of operation.

Furthermore, there is a possibility that the object is continuous at the unmeasurable region when there is little difference in the distance data of an unmeasurable region and the adjacent measuring points on either side thereof, and when the unmeasurable region is small in space on the object, but there is a high possibility that the objects are separated at the unmeasurable region when there is a large difference in the distance data of an unmeasurable region and the adjacent measuring points in either side thereof, and when the unmeasurable region is large in space on the object. Accordingly, the distance data of an unmeasurable region can be accurately set by considering the difference in the distance data of the unmeasurable region and the adjacent measuring points on either side thereof, and the space of the unmeasurable region on the object.

If the luminance difference between the unmeasurable region and the adjacent measuring points on either side thereof is within a predetermined range, it is also possible that the object is continuous at the unmeasurable region, but there is an extremely high possibility that the object is discontinuous at the unmeasurable region when the luminance difference is extremely large between the unmeasurable region and the adjacent measuring points on either side thereof. Accordingly, the distance data of an unmeasurable region can be accurately set by considering the luminance difference of measuring points.

If a camera is provided with the aforesaid distance measuring device, the distance data of unmeasurable regions can be accurately set, such that an area can be accurately displayed within the view of a viewfinder whether the object is, for example continuous or discontinuous in the unmeasurable region.

If a camera is provided with the aforesaid distance measuring device, the distance data of unmeasurable regions can be accurately set, such that a main object can be recognized by accurately recognizing, for example, whether or not an object is continuous or discontinuous in the unmeasurable region.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A distance measuring device comprising:
   a distance measuring sensor for measuring a plurality of regions of an object region and outputting distance data;
   a detector for detecting an unmeasurable region within the plurality of measurement regions based on the distance data output from said distance measuring sensor;
   a calculator for calculating a spacing on the object corresponding to the unmeasurable region detected by said detector; and
   a creator for creating distance data of the unmeasurable region based on the distance data of the measurable region among the plurality of measurement regions and the spacing calculated by said calculator.

2. A distance measuring device according to claim 1, wherein said detector detects the unmeasurable region by determining a reliability of the distance data output from the distance measuring sensor.

3. A distance measuring device according to claim 1, said creator creates the distance data of the unmeasurable region based on the distance data of the measurable regions adjacent to the unmeasurable region.

4. A distance measuring device according to claim 3, said creator creates the distance data of the unmeasurable region based on a distance difference of the measurable regions adjacent to both sides of the unmeasurable region.

5. A distance measuring device according to claim 4, said creator determines whether or not the distance data of the unmeasurable region is created by comparing the distance difference of the measurable regions to a specific value.

6. A distance measuring device according to claim 1, said creator, determines whether or not the distance data of the unmeasurable region is created by comparing the spacing of the immeasurable region calculated by said calculator to a specific value.

7. A distance measuring device according to claim 1, further comprises a luminance calculator for calculating a luminance of the measurement regions, and wherein said creator determines whether or not the distance data of the unmeasurable region is created in accordance with the difference in the luminance of the unmeasurable region and the luminance of the measurable regions.

8. A distance measuring device according to claim 1, further comprises a region selector for selecting the measurement regions including at least three or more measuring points from among a plurality of measuring points, and wherein said detector detects an unmeasurable region within the selected measurement regions.

9. A camera provided with a distance measuring device comprising:
   a distance measuring sensor for measuring a plurality of distance measuring regions of an object region and outputting distance data;
   a detector for detecting an unmeasurable region within the plurality of distance measuring regions based on the distance data output from said distance measuring sensor;
   a calculator for calculating a spacing on the object corresponding to the unmeasurable region detected by said detector;
   a creator for creating distance data of the unmeasurable region based on the distance data of the measurable region among the plurality of distance measuring regions and the spacing calculated by said calculator;
   a finder for viewing the object region;
   a display for displaying a range corresponding to each distance measuring region within the view of the finder; and
   a controller for recognizing a photographic object corresponding to the distance data of the measurable region and the created distance data of the unmeasurable region and for controlling display on said display in accordance with the recognition result.

10. A camera provided with a distance measuring device comprising:
    a distance measuring sensor for measuring a plurality of measurement regions of an object region and outputting distance data;
    a detector for detecting an unmeasurable region within the plurality of measurement regions based on the distance data output from said distance measuring sensor;
    a calculator for calculating a spacing on the object corresponding to the unmeasurable region detected by said detector;
    a creator for creating distance data of the unmeasurable region based on the distance data of the measurable region among the plurality of measurement regions and the spacing calculated by said calculator;
    a focus adjuster for adjusting the focus of a photographic lens; and
    a controller for recognizing a photographic object corresponding to the distance data of the measurable region and the created distance data of the unmeasurable region and for controlling said focus adjuster in accordance with the recognition result.

* * * * *

UNITED STATES PATENT AND TRADEMARK OFFICE
CERTIFICATE OF CORRECTION

PATENT NO. : 6,963,376 B2
DATED : November 8, 2005
INVENTOR(S) : Kenji Nakamura

It is certified that error appears in the above-identified patent and that said Letters Patent is hereby corrected as shown below:

Column 6,
Line 50, delete "no. i i=2~N)" and insert -- no. i(i=2~N) --.

Column 9,
Line 27, delete "regions" and insert -- measurement regions --.
Line 57, delete "creator," and insert -- creator --.
Line 59, delete "immeasurable" and insert -- unmeasurable --.

Signed and Sealed this

Seventeenth Day of January, 2006

JON W. DUDAS
*Director of the United States Patent and Trademark Office*